(12) United States Patent
Kim et al.

(10) Patent No.: US 7,768,950 B2
(45) Date of Patent: Aug. 3, 2010

(54) TRANSMISSION PACKET STRUCTURE FOR TRANSMITTING UNCOMPRESSED A/V DATA AND TRANSCEIVER USING THE SAME

(75) Inventors: Ki-bo Kim, Suwon-si (KR); Chang-yeul Kwon, Yongin-si (KR); Seong-soo Kim, Seoul (KR); Ji-sung Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 11/783,166

(22) Filed: Apr. 6, 2007

(65) Prior Publication Data

US 2008/0049744 A1 Feb. 28, 2008

Related U.S. Application Data

(60) Provisional application No. 60/830,619, filed on Jul. 14, 2006.

(30) Foreign Application Priority Data

Sep. 8, 2006 (KR) .................. 10-2006-0086965

(51) Int. Cl.
*H04B 7/00* (2006.01)
*H04L 12/56* (2006.01)
(52) U.S. Cl. .................. 370/310; 370/389; 370/476
(58) Field of Classification Search .................. None
See application file for complete search history.

(56) References Cited

U.S. PATENT DOCUMENTS

| 5,832,001 | A  | * | 11/1998 | Choi .................. 714/790 |
| 6,771,660 | B1 |   | 8/2004  | Bourlas et al. |
| 6,956,834 | B2 |   | 10/2005 | Stanwood et al. |
| 7,145,919 | B2 | * | 12/2006 | Krishnarajah et al. ........ 370/474 |
| 7,301,966 | B2 | * | 11/2007 | Metcalf .................. 370/474 |
| 7,558,240 | B2 | * | 7/2009  | Chen et al. .................. 370/338 |
| 2005/0180363 | A1 | * | 8/2005 | Yano et al. .................. 370/335 |
| 2005/0201361 | A1 | * | 9/2005 | Morioka et al. ............. 370/352 |
| 2006/0056443 | A1 | * | 3/2006 | Tao et al. .................. 370/462 |
| 2006/0063492 | A1 | * | 3/2006 | Iacono et al. ............. 455/67.11 |
| 2008/0253327 | A1 | * | 10/2008 | Kohvakka et al. ........... 370/330 |

OTHER PUBLICATIONS

Doufexi, Angela, et al, "A Comparison of the HIPERLAN/2 and IEEE 802.11a Wireless LAN Standards", May 2002, IEEE, IEEE Communications Magazine, pp. 172-180.*

* cited by examiner

*Primary Examiner*—Hong Cho
*Assistant Examiner*—Robert C Scheibel
(74) *Attorney, Agent, or Firm*—Sughrue Mion, PLLC

(57) ABSTRACT

A transmission packet structure for transmitting uncompressed AV data is provided. The transmission packet structure includes a payload including multiple TDUs error-correction coded at a predetermined coding rate, wherein the payload is classified according to importance of bits constituting the uncompressed AV data; a MAC header added to the payload, wherein information for medium access control is recorded in the MAC header; and a PHY header comprising information about the coding rate, wherein the PHY header is added to the MAC header.

21 Claims, 8 Drawing Sheets

TRANSMISSION PACKET STRUCTURE FOR TRANSMITTING UNCOMPRESSED A/V DATA AND TRANSCEIVER USING THE SAME

CROSS-REFERENCE TO RELATED APPLICATION

This application is based on, and claims priority from Korean Patent Application No. 10-2006-0086965 filed on Sep. 8, 2006, in the Korean Intellectual Property Office, and U.S. Provisional Patent Application No. 60/830,619 filed on Jul. 14, 2006 in the United States Patent and Trademark Office, the disclosures of which are incorporated herein in its entirety by reference.

BACKGROUND OF THE INVENTION

1. Field of the Invention

Apparatuses and methods consistent with the present invention relate to wireless communication technology, and more particularly to a data structure for transmitting large amounts of multimedia content.

2. Description of the Prior Art

Because of the current trend towards wireless networks, and the increase in demand for transmission of large amounts of multimedia data, there has been an increasing demand for research on more effective transmission methods in a wireless network environment. Moreover, it is now increasingly necessary to wirelessly transmit high quality video such as Digital Video Disk (DVD) video and High Definition Television (HDTV) video among various home devices.

Presently, one task group of the IEEE 802.15.3c is pursuing the establishment of a technical standard for transmitting large amounts of data in a wireless home network. This standard, which is referred to as Millimeter Wave (mmWave), uses radio waves having a millimeter wavelength (i.e., radio waves having a frequency of 30 to 300 GHz) for transmission of large amounts of data. Up to now, such a frequency band was an unlicensed band limited to communication providers, radio wave astronomy, vehicle collision prevention, and others.

FIG. 1 is a diagram comparing the frequency bands of the IEEE 802.11 series standards and mmWave. The IEEE 802.11b or IEEE 802.11g uses a carrier frequency of 2.4 GHz and has a channel bandwidth of about 20 MHz. Further, IEEE 802.11a or IEEE 802.11n uses a carrier frequency of 5 GHz and has a channel bandwidth of about 20 MHz. However, mmWave uses a carrier frequency of 60 GHz, and has a channel bandwidth of about 0.5 to 2.5 GHz. Herein, it should be noted that the mmWave has a carrier frequency and a channel bandwidth much higher and much wider than those of the existing IEEE 802.11 series standards. By using high frequency signals (millimeter wave), it is possible to obtain a very high data rate of several Gbps, and to reduce the antenna size to less than 1.5 mm, and it is thus possible to create a single chip including an antenna. Further, since the attenuation ratio in air is very high, it is also possible to reduce interference among devices.

Recently, research has been conducted in order to transmit uncompressed audio or video data (hereinafter, referred to as uncompressed AV data) among radio devices by using the high bandwidth of the millimeter wave. Compressed AV data is lossy-compressed through motion compensation, DCT conversion, quantization, variable length coding, and others, in such a manner that portions less sensitive to human visual and auditory senses are removed. However, the uncompressed AV data include digital values (e.g. R, G and B components) representing pixel components.

Accordingly, bits included in the compressed AV data have no priority according to importance, but bits included in the uncompressed AV data have a priority. For example, as illustrated in FIG. 2, in the case of an 8 bit image, one pixel component is expressed by 8 bits. Of them, a bit (bit of the highest level) expressing the highest order is a Most Significant Bit (MSB), and a bit (bit of the lowest level) expressing the lowest order is a Least Significant Bit (LSB). That is, respective bits in one byte data including 8 bits have different levels of importance in restoring image or voice signals. If an error occurs in a bit with a high importance during transmission, error occurrence can be more easily detected as compared to the case where an error has occurred in bits with low importance. Accordingly, bit data with high importance must be greatly protected in order to prevent an error from occurring therein, in a different way from bit data with low importance. However, as with the conventional transmission scheme of IEEE 802.11 series, an error correction scheme and a retransmission scheme with the same coding rate for all bits to be transmitted have been used.

FIG. 3 is a diagram illustrating the structure of a physical layer (PHY) Protocol Data Unit (PPDU) of the IEEE 802.11a standard. The PPDU 30 includes a preamble, a signal field and a data field. The signal field includes a rate field representing a transmission rate, a length field representing the length of the PPDU, and others information. Typically, the signal field is encoded by one symbol. The data field includes a PSDU, a tail bit and a pad bit, and data to be actually transmitted is included in the PSDU.

The conventional frame format as described above may be effective in general data transmission. However, in order to transmit large amounts of data at several Gbps in an ultra-short distance of about 10 m, new header and frame structures must be considered. Specifically, as the main application field of wireless transmission technology transmitting data at several Gbps, in order to transmit uncompressed audio/video data (hereinafter, referred to as uncompressed AV data), it is necessary to design header and frame structures in consideration of error correction and retransmission schemes based on the importance of data as described above.

SUMMARY OF THE INVENTION

Accordingly, the present invention has been made to solve the above-mentioned problems occurring in the prior art, and it is an aspect of the present invention to provide a method for constructing a transmission packet suitable for transmission of large amounts of uncompressed AV data through several Gbps bandwidth.

It is another aspect of the present invention to provide an apparatus for transmitting/receiving the transmission packet as described above.

The aspect of the present invention is not limited to that stated above. Those of ordinary skill in the art will recognize additional aspects in view of the following description of the present invention.

According to an aspect of the present invention, there is provided a transmission packet structure for transmitting uncompressed AV data, the transmission packet structure including a payload having multiple Transmission Data Units (TDUs) error-correction coded at a predetermined coding rate, in which the payload is classified according to importance of bits constituting the uncompressed AV data; a MAC header added to the payload, in which information for medium access control is recorded in the MAC header; and a PHY header having information about the coding rate, in which the PHY header is added to the MAC header.

According to another aspect of the present invention, there is provided a transmitter for transmitting uncompressed AV data, the transmitter including a unit generating a transmission packet for transmitting the uncompressed AV data; and a unit transmitting the generated transmission packet, in which the transmission packet includes a payload comprising multiple TDUs error-correction coded at a predetermined coding rate, in which the payload is classified according to importance of bits constituting the uncompressed AV data; a MAC header added to the payload, in which information for medium access control is recorded in the MAC header; and a PHY header having information about the coding rate, in which the PHY header is added to the MAC header.

According to another aspect of the present invention, there is provided a receiver receiving uncompressed AV data, the receiver including a unit receiving a transmission packet having the uncompressed AV data and; a unit restoring AV data from the received transmission packet, in which the transmission packet includes a payload having multiple TDUs error-correction coded at a predetermined coding rate, in which the payload is classified according to importance of bits constituting the uncompressed AV data; a MAC header added to the payload, in which information for medium access control is recorded in the MAC header; and a PHY header having information about the coding rate, in which the PHY header is added to the MAC header.

BRIEF DESCRIPTION OF THE DRAWINGS

The above and other aspects, features and advantages of the present invention will be apparent from the following detailed description taken in conjunction with the accompanying drawings, in which.

DETAILED DESCRIPTION OF THE EXEMPLARY EMBODIMENTS

Figure 1:
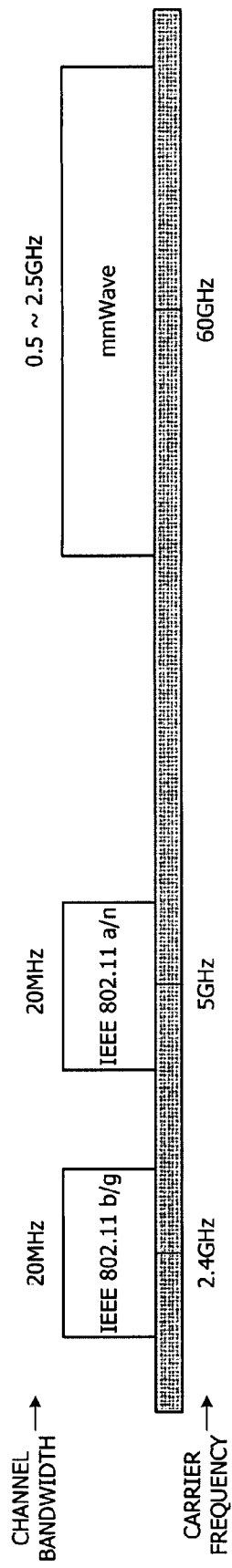
FIG. 1 is a diagram illustrating a comparison of a frequency band between standards of IEEE 802.11 series and mmWave.
Figure 2:
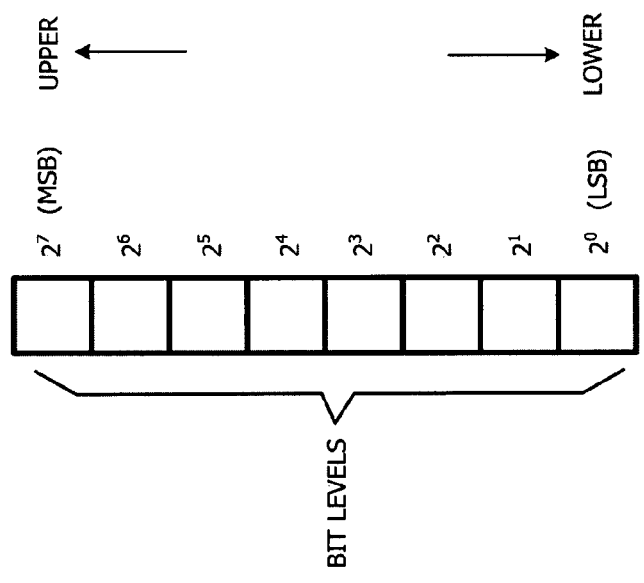
FIG. 2 is a diagram illustrating one pixel component by using multiple bit levels.

Aspects and features of the present invention, and ways to achieve them will be apparent from exemplary embodiments of the present invention as will be described below together with the accompanying drawings. However, the scope of the present invention is not limited to such exemplary embodiments and the present invention may be realized in various forms. The exemplary embodiments to be described below are provided to properly disclose the present invention, and assist those skilled in the art to completely understand the present invention. The present invention is defined only by the scope of the appended claims. Also, the same reference numerals are used to designate the same elements throughout the specification.

Hereinafter, one exemplary embodiment of the present invention will be described with reference to accompanying drawings.

Figure 4:
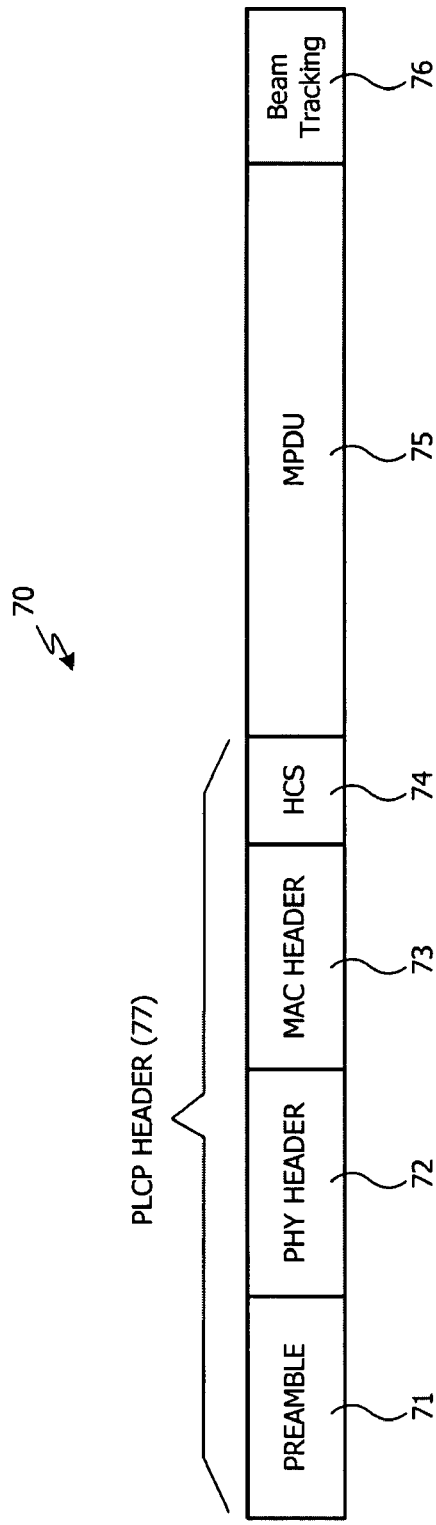
FIG. 4 is a diagram illustrating the structure of a transmission packet according to one exemplary embodiment of the present invention.

FIG. 4 is a diagram illustrating the structure of a transmission packet 70 according to one exemplary embodiment of the present invention. The transmission packet 70 includes a Physical Layer Convergence Protocol (PLCP) header 77, a MPDU field 75 and a beam tracking field 76. The PLCP header 77 includes a preamble 71, a PHY header 72, a MAC header 73 and a Header Check Sequence (HCS) field 74.

The preamble 71 corresponds to signals for synchronization and channel estimation of a PHY layer, and includes multiple short and long training signals.

The PHY header 72 is an area generated based on information used in the PHY layer, and the MAC header 73 is an area generated based on information used in the MAC layer. The HCS field 74 is an area used in order to determine if an error has occurred in the PLCP header 77.

The MPDU field 75 is an area in which data to be transmitted, i.e. uncompressed AV data at a predetermined coding rate, is recorded.

The beam tracking field 76 is an area in which supplementary information for beam steering is recorded. The beam steering represents setting the directivity of an antenna so as to be suitable for the reception direction of radio signals having directivity. For example, a receiver for receiving radio signals having directivity receives the same radio signals having different phases from an array antenna by calculating a Direction Of Arrival (DOA) from the sum of the received signals through a Discrete Fourier Transform (DFT), and establishing the directivity of the received signals through a combination of amplitudes and phases, thereby optimizing the array antenna in a corresponding direction.

To this end, the beam tracking field 76 records information referred to when the directivity of the antenna is established in the receiver as described above.

Figure 5:
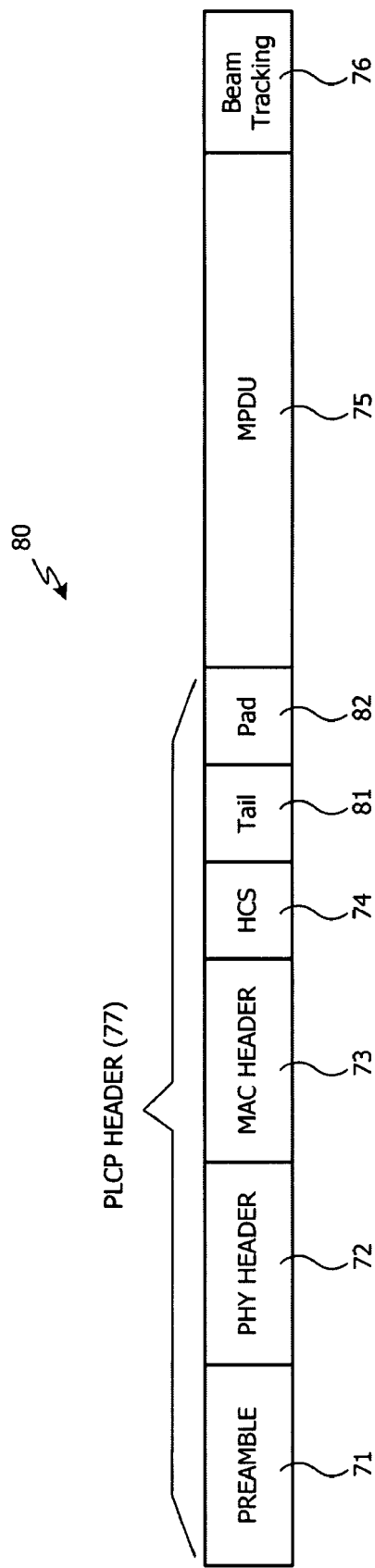
FIG. 5 is a diagram illustrating the structure of a transmission packet according to another exemplary embodiment of the present invention.

FIG. 5 is a diagram illustrating the structure of a transmission packet 80 according to another exemplary embodiment of the present invention. The transmission packet 80 is the same as the transmission packet 70, except that a tail bit 81 and a pad bit 82 have been added to the HCS field 74 of the PLCP header 77. The tail bit 81 and the pad bit 82 have been added to the PLCP header 77 in consideration of the size of data when error correction coding is applied. The tail bit 81 plays the role of causing an error correction coder to be in a zero state. The pad bit 82 is inserted in order to cause the size of data to be a multiple of the number of bits used in one symbol.

Figure 6:
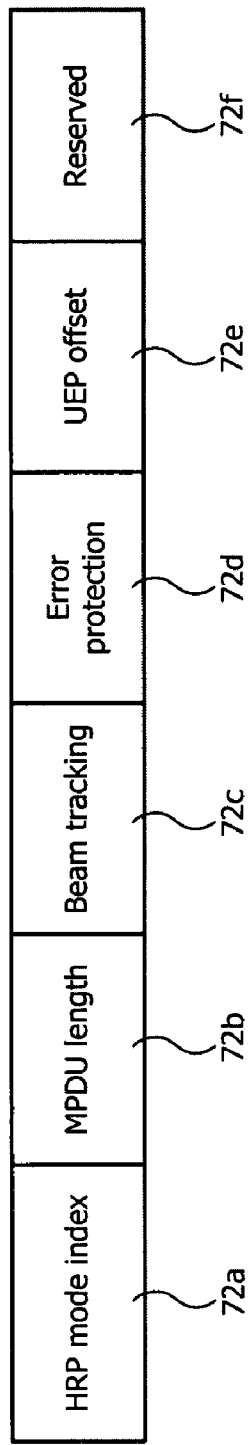
FIG. 6 is a diagram illustrating the structure of a PHY header according to one exemplary embodiment of the present invention.

FIG. 6 is a diagram illustrating the structure of the PHY header 72 according to one exemplary embodiment of the present invention. As illustrated in FIG. 6, the PHY header 72 includes a High Rate PHY (HRP) mode index field 72a, an MPDU length field 72b, a beam tracking field 72c, an error protection field 72d, a Unequal Error Protection (UEP) offset field 72e and a reserved field 72f.

Figure 3:
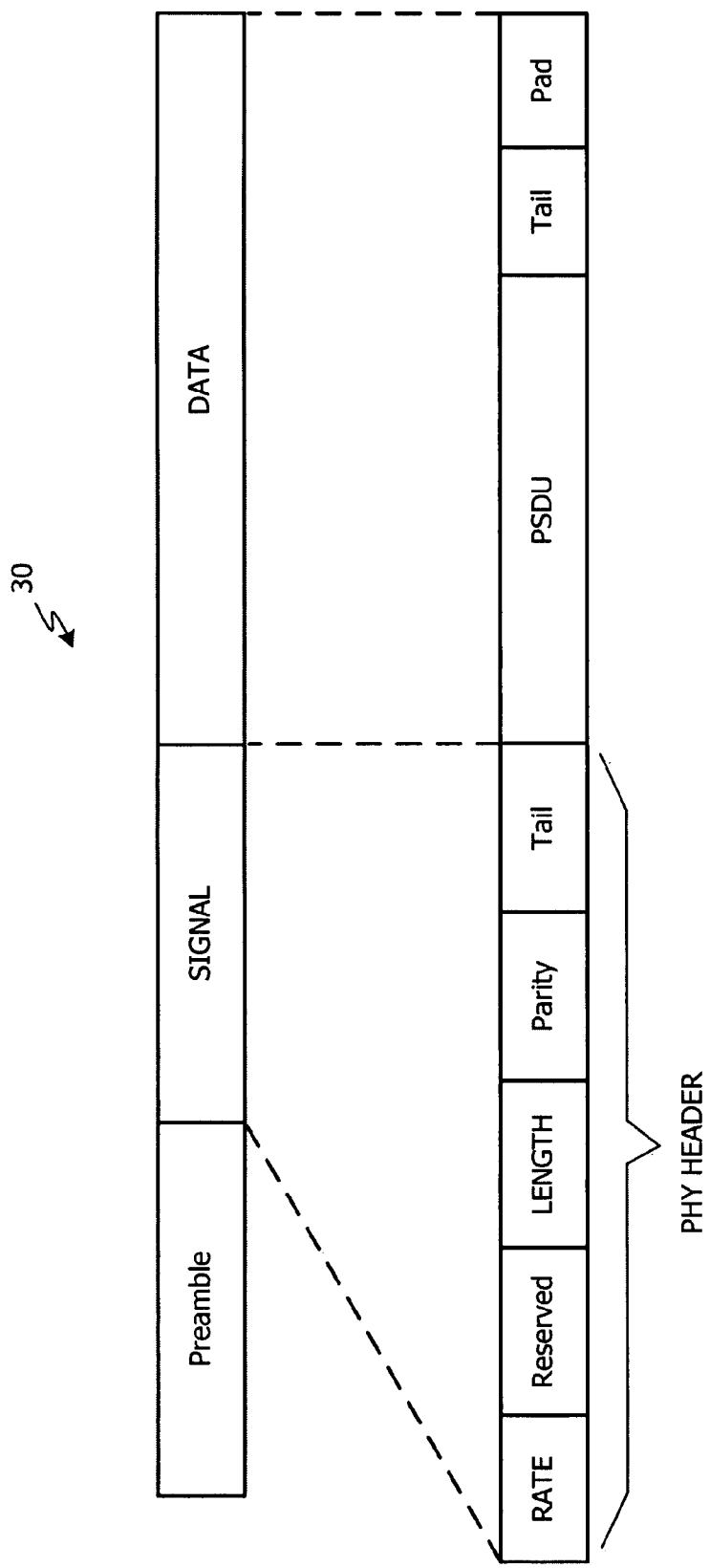
FIG. 3 is a diagram illustrating the structure of a PPDU of an IEEE 802.11a standard.

Since the present invention uses a transmission rate of more than 3 Gbps in order to transmit uncompressed AV data, the PHY header 72 must be different from the PHY header of FIG. 3. Because of this, the PHY header 72 is defined as an HRP header.

The HRP mode index field 72a denotes the number of groups included in the MPDU 75, a coding rate and a modulation method applied to each group, and others. In one exemplary embodiment of the present invention, the mode index is defined to have values from zero to six, as shown in Table 1. It is also possible to arrange fields indicating items such as grouping information (the number of bit levels included in one group), a coding rate and a modulation scheme, respectively. However, if the mode index is used, it is possible to indicate multiple item combinations by using one index. The transmission mode table of Table 1 corresponding to the mode index must be preset between a transmitter and a receiver, or must be transmitted from the transmitter to the receiver.

TABLE 1

| HRP mode index | Coding mode | Modulation method | Coding rate First group [7] [6] [5] [4] | Second group [3] [2] [1] [0] |
|---|---|---|---|---|
| 0 | Equal Error | QPSK | 1/3 | |
| 1 | Protection | QPSK | 2/3 | |
| 2 | (EEP) | 16-QAM | 3/3 | |
| 3 | UEP | QPSK | 4/7 | 4/5 |
| 4 | | 16-QAM | 4/7 | 4/5 |
| 5 | Retransmission | QPSK | 1/3 | infinite |
| 6 | | 16-QAM | 1/3 | Infinite |

Referring to Table 1, when the HRP mode index has a value in the range of 0 to 2, an EEP is applied. When the HRP mode index has a value of 3 or 4, a UEP is applied to two divided groups. Of them, group 1 includes four upper bit levels ([7] [6] [5] [4]), and group 2 includes four lower bit levels ([3] [2] [1] [0]). In Table 1, when the UEP is applied, the number of divided groups is two. However, the number of divided groups and the number of bit levels belonging to a corresponding group may be set differently without limit. In the case of 8 bit data, the number of divided groups may have a maximum value of 8.

In the meantime, in retransmission, it should be noted that only group 1 with the relatively high importance is retransmitted at a coding rate of 1/3, and group 2 with the relatively low importance is not transmitted (the coding rate is infinite).

Referring to FIG. 6, the MPDU length field 72b indicates the size of the MPDU 75 by the octet. This field 72b is necessary in order to exactly read the MPDU 75 having a variable size. For example, the MPDU length field 72b may consist of 20 bits.

The beam tracking field 72c is a one bit field. When supplementary information for beam steering is included in a transmission packet, the beam tracking field 72c is 1. Otherwise, the beam tracking field 72c is 0. That is, in FIG. 4, if the beam tracking field 76 is added to the MPDU 75, the beam tracking field 72c is 1. Otherwise, the beam tracking field 72c is 0.

The error protection field 72d denotes if the UEP is applied to bits included in the MPDU 75. This field 72d may indicate a specific UEP mode used among various UEP modes.

The UEP offset field 72e denotes a number of a symbol, from which UEP coding starts, when counting is performed from the first symbol after the MAC header 73. In detail, the UEP offset field 72e may be expressed by 10 bits.

The reserved field 72f is a field reserved in order to be used for a specific purpose later.

In FIG. 5, the MAC header 73 is an area in which information for medium access control is recorded, which is used for medium access control, similarly to IEEE 802.11 series standards or an IEEE 802.3 standard. The MAC header 73 records the MAC addresses of the transmitter and receiver, ACK policy, fragment information, and others pieces of information.

Figure 7:
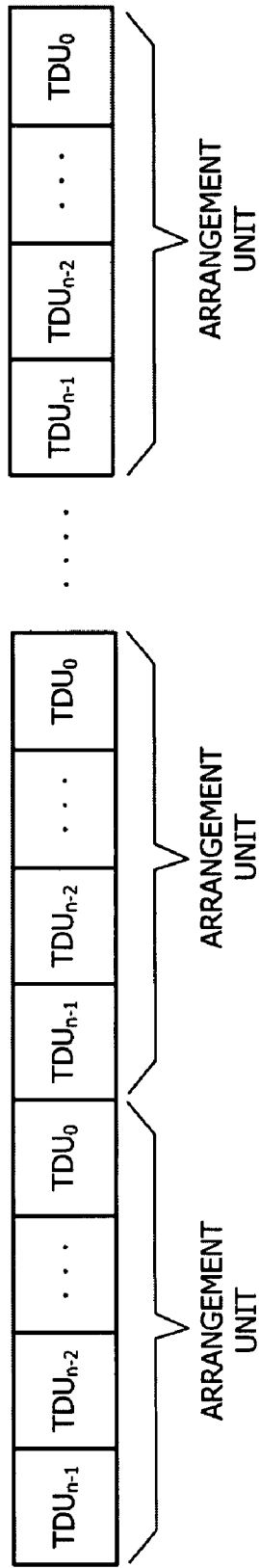
FIG. 7 is a diagram illustrating the structure of a Medium Access Control (MAC) Protocol Data Unit (MPDU) according to one exemplary embodiment of the present invention.

The MPDU field 75 includes multiple TDUs as illustrated in FIG. 7. In error correction coding, the same coding rate is applied to the TDUs with the same number. Such TDUs may be arranged according to a sequence in which a TDU with higher importance precedes a TDU with lower importance, and vice versa. In FIG. 7, n TDUs exist from group 0 to group (n–1). Of them, the group (n–1) has the highest importance. The TDUs are sequentially arranged in this way to form one arrangement unit. The arrangement unit repeats to the end of the MPDU field 75 for arrangement.

Figure 8:
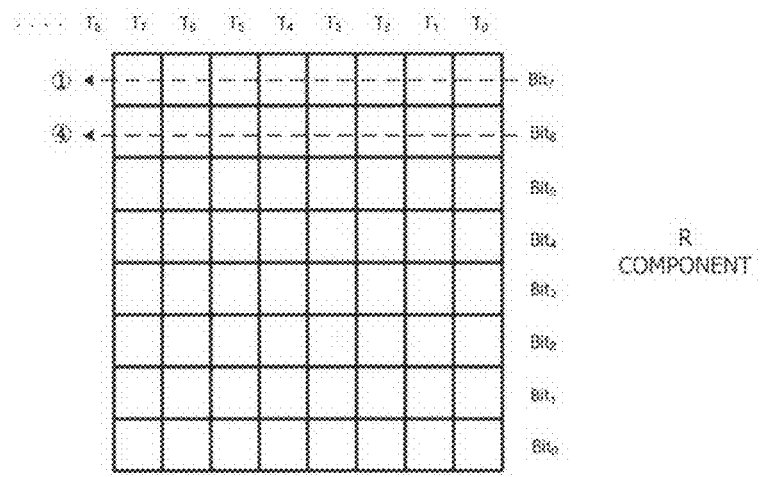
FIG. 8 is a diagram illustrating a sequence for scanning bits of a divided sub-pixel.
Figure 8:
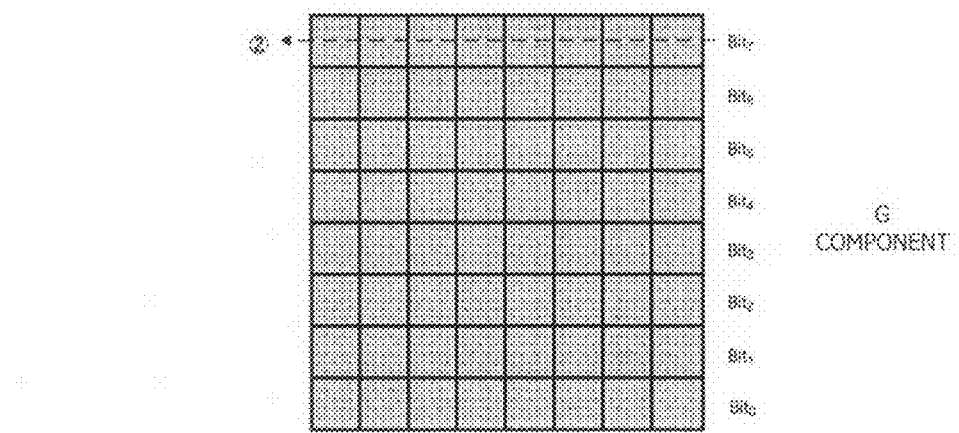
Figure 8:
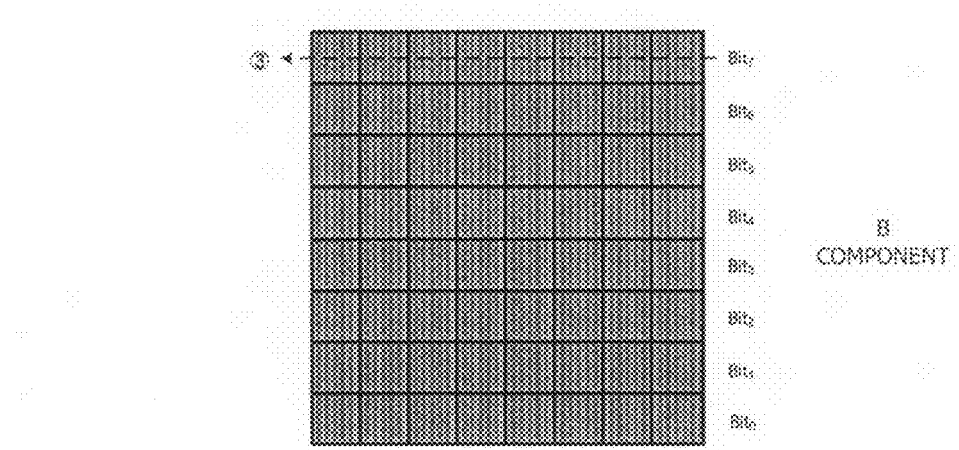
Figure 9:
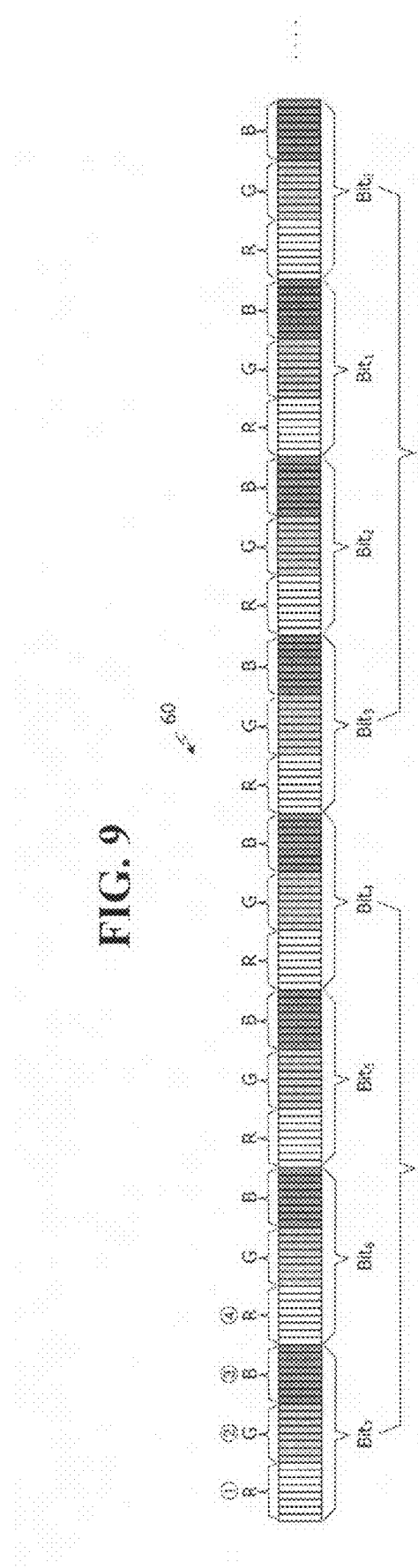
FIG. 9 is a diagram illustrating an example of a TDU including four bit levels.
Figure 10:
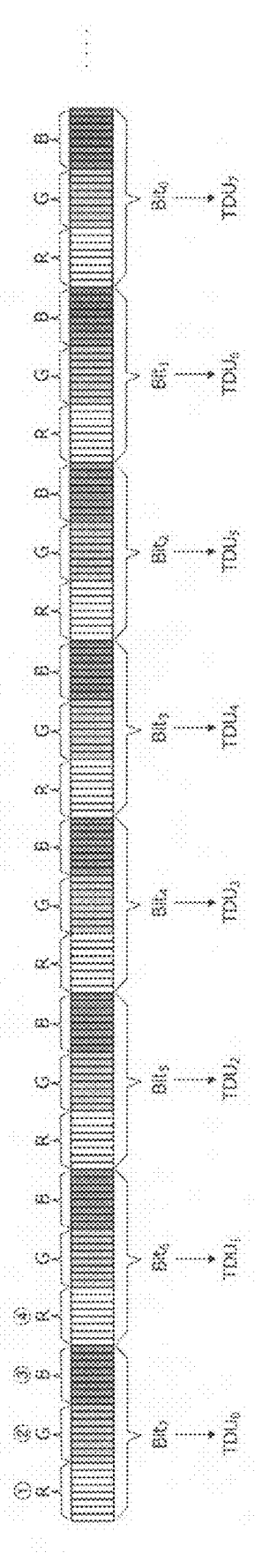
FIG. 10 is a diagram illustrating an example of a TDU including one bit level.

One TDU includes at least one bit level. FIGS. 8 to 10 are diagrams illustrating one example of the configuration method of a TDU.

FIG. 8 is a diagram illustrating a scanning sequence when uncompressed AV data includes three sub-pixel components. In FIG. 8, $T_0$ to $T_7$ denote the sequence of pixels, respectively. That is, scanning is sequentially performed in a left direction starting from $T_0$. FIG. 8 shows a case in which the number (the number of scannings) of bits scanned in one bit level is eight.

Values of inputted sub-pixels are sequentially stored in a predetermined buffer. In the storage process, the values are sequentially recorded in a memory according to a data input sequence. In a scanning process, desired bits may be read according to an address sequence provided by a data address generator.

Such a scanning process is sequentially performed from the highest-level bit to the lowest-level bit. In one exemplary embodiment, since one pixel includes R, G and B components, a scanning ① is performed for a bit of the R component of the highest level, a scanning ② is performed for a bit of the G component of the highest level, and then a scanning ③ is performed for a bit of the B component of the highest level. Next, a scanning ④ is performed for a next upper bit $Bit_6$ of the R component. Such a process is repeated in the same way until scanning is completed for a bit of the B component of the lowest level.

After scanning is completed for all bits of one sub-pixel component as described above, bits of each bit level are alternatively scanned for a sub-pixel instead of scanning a subsequent sub-pixel component. This is for reducing a reproduction delay that may occur in a receiver-side limiting the number of scannings. In the above description, a scanning sequence for sub-pixels is R, G and B, but this sequence may change.

FIG. 9 is a diagram illustrating a set of bits multiplexed through the scanning process as illustrated in FIG. 8. The multiplexed bit stream 60 is arranged according to a sequence from a bit $Bit_7$ of the highest level to a bit $Bit_0$ of the lowest level, and bits of the same bit level are alternatively arranged according to R, G and B components. After $Bit_0$ illustrated in FIG. 9, $Bit_7$ to $Bit_0$ scanned from a subsequent pixel ($T_8$ to $T_{15}$) are arranged. Accordingly, TDUs are also repeatedly arranged.

FIG. 9 illustrates an example in which one TDU includes four bit levels, but the number of bit levels including the TDU may change without limit. One TDU may also include a minimum bit level, i.e. one bit level, as illustrated in FIG. 10.

Figure 11:
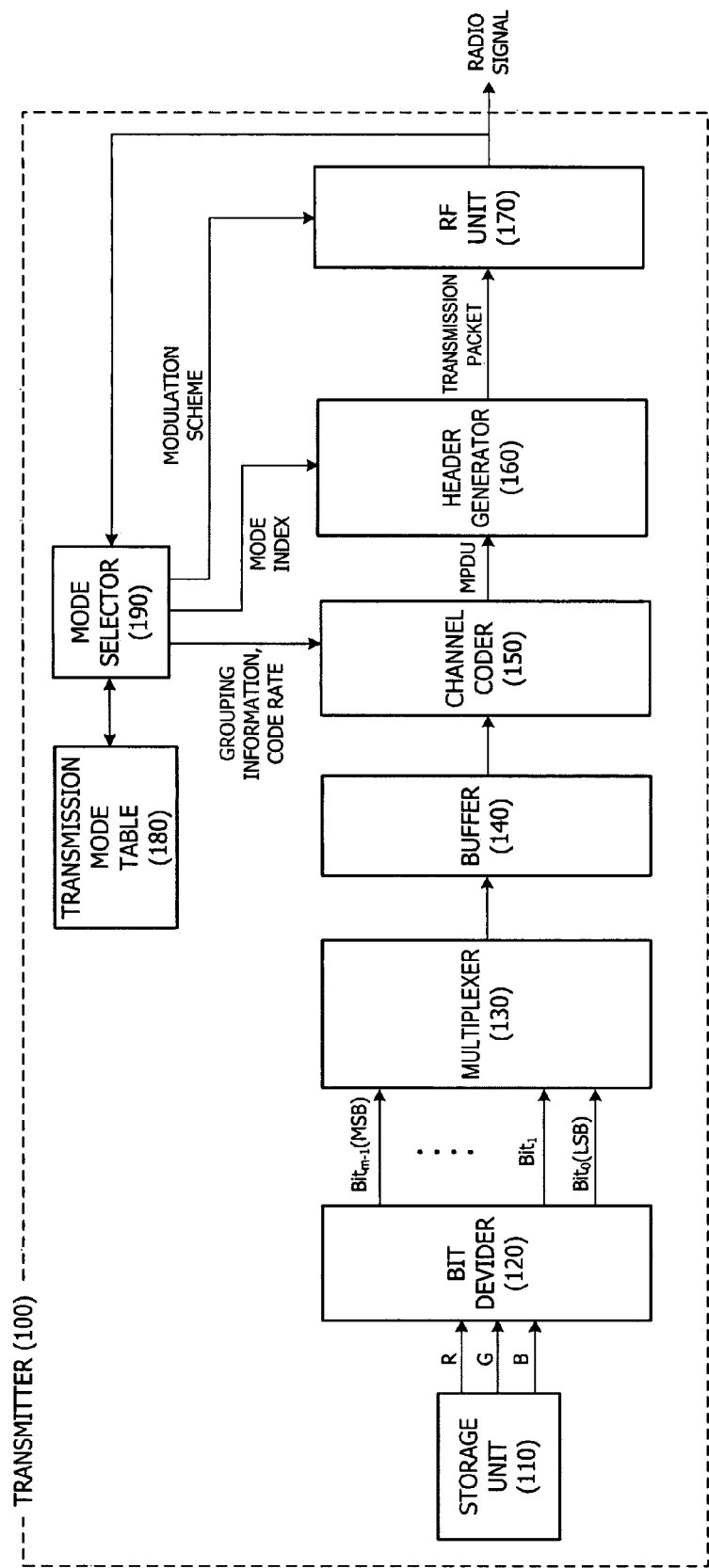
FIG. 11 is a block diagram illustrating the construction of a transmitter for transmitting a transmission packet according to one exemplary embodiment of the present invention.

FIG. 11 is a block diagram illustrating the construction of a transmitter 100 for transmitting the transmission packet 70 or 80 according to one exemplary embodiment of the present invention.

The transmitter 100 may include a storage unit 110, a bit divider 120, a multiplexer 130, a buffer 140, a channel encoder 150, a header generator 160, a modulation and Radio Frequency (RF) unit 170, a transmission mode table 180 and a mode selector 190.

The storage unit 110 stores uncompressed AV data. When the AV data is video data, sub-pixel values for each pixel are stored in the storage unit 110. The sub-pixel values may be variously stored according to color spaces (e.g. RGB color space, YCbCr color space, and others). However, the present invention will be described on the assumption that each pixel includes three sub-pixels, i.e. R, G and B, according to color spaces. Of course, when video data is a gray image, one sub-pixel can constitute a pixel because only one sub-pixel component exists. Further, two or four sub-pixel components may also constitute one pixel.

The storage unit 110 stores uncompressed AV data. When the AV data is video data, sub-pixel values for each pixel are stored in the storage unit 110. The sub-pixel values may be variously stored according to color spaces (e.g. RGB color space, YCbCr color space, and others). However, the present invention will be described on the assumption that each pixel includes three sub-pixels (i.e. R, G and B) according to color spaces. Of course, when video data is a gray image, one sub-pixel can constitute a pixel because only one sub-pixel component exists. Further, two or four sub-pixel components may also constitute one pixel.

In order to classify the divided bits according to importance, the multiplexer 130 scans and multiplexes the divided bits according to levels. Through such a multiplexing process, multiple TDUs can be formed as illustrated in FIG. 9 or 10.

The buffer 140 temporarily stores the multiple TDUs generated by the multiplexer 130.

The channel encoder 150 performs error correction coding at coding rates determined according to the TDUs stored in the buffer 140, thereby generating a payload. Information (the number of bit levels included in the TDUs) about the TDUs and coding rates according to the TDUs are provided from the mode selector 190. In the MPDU 75 as illustrated in FIG. 7, the same type of TDU (in TDUx of FIG. 7, "x" denotes an index indicating a TDU type) has the same coding rate.

The error correction coding may be largely classified as block coding and convolution coding. The block coding (e.g., Reed-Solomon coding) is technology for performing coding and decoding data per block, and the convolution coding is technology for performing coding by comparing previous data with current data by using a memory of a certain size. It is well known that the block coding is tolerant to a burst error and the convolution coding is tolerant to a random error.

Generally, the error correction coding includes a process of converting an inputted bit "k" to a codeword of n bits. Herein, a coding rate may be expressed by k/n. As the coding rate becomes lower, the error correction probability becomes larger because an input bit is coded into a codeword of larger bits.

The results of the error correction coding are collected, so that a payload, i.e., the MPDU 75 is, is formed.

The header generator 160 generates the preamble 71, the PHY header 72 and the MAC header 73, and adds the generated preamble 71, PHY header 72 and MAC header 73 to the MPDU 75 including the multiple coded TDUs, thereby generating the transmission packet 70 or 80 as illustrated in FIG. 4 or 5.

Herein, the HRP mode index field 72a of the PHY header 72 records a mode index. The mode index denotes a combination of grouping information (grouping scheme of a TDU), a coding rate, a modulation scheme, and others. The mode index is provided by the mode selector 190. Further, the header generator 160 generates the various fields 72b, 72c, 72d and 72f of FIG. 6 in addition to the field 72a.

The modulation and RF unit 170 modulates a transmission packet by using a modulation scheme provided from the mode selector 190, and transmits the modulated transmission packet through an antenna.

The mode selector 190 selects one mode index from the transmission mode table 180 as shown in Table 1 based on a transmission environment of a transmission packet. The mode index denotes a combination of grouping information, a coding rate and a modulation scheme. The mode selector 190 provides the channel encoder 150 with the grouping information and the coding rate according to the mode index, and provides the modulation and RF unit 170 with the modulation scheme according to the mode index.

Figure 12:
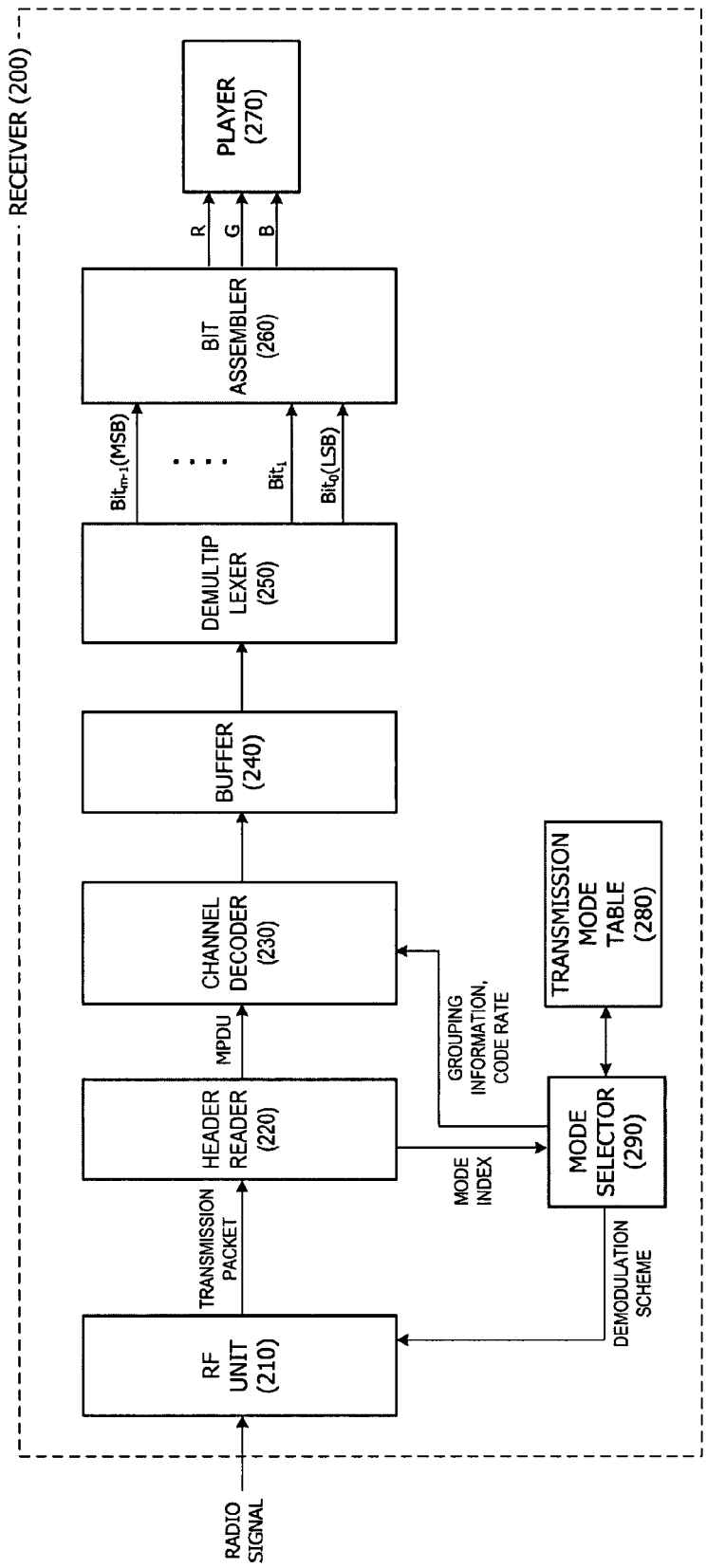
FIG. 12 is a block diagram illustrating the construction of a receiver for receiving a transmission packet according to one exemplary embodiment of the present invention.

FIG. 12 is a block diagram illustrating the construction of a receiver 200 for receiving the transmission packet 70 or 80 according to one exemplary embodiment of the present invention.

The receiver 200 may include a demodulation and RF unit 210, a header reader 220, a channel decoder 230, a buffer 240, a demultiplexer 250, a bit assembler 260, a reproducer 270, a transmission mode table 280 and a mode selector 290.

The demodulation and RF unit 210 demodulates received radio signals to restore a transmission packet. A demodulation scheme applied to the demodulation may be provided from the mode selector 290.

The header reader 220 reads the PHY header and the MAC header, which are added by the header generator 160 of FIG. 11, and provides the channel decoder 230 with an MPDU (i.e. payload) from which the headers have been removed.

Herein, the header reader 220 reads the mode index recorded in the HRP mode index field 72a of the PHY header 72, and provides the mode selector 290 with the read mode index. Further, the header reader 220 reads the various fields 72b, 72c, 72d and 72f of FIG. 6 in addition to the field 72a.

The mode selector 290 selects grouping information, a coding rate and a demodulation scheme corresponding to the mode index provided from the header reader 220 with reference to the transmission mode table 280, provides the demodulation and RF unit 210 with the demodulation scheme, and provides the channel decoder 230 with the grouping information and the coding rate. The demodulation and RF unit 210 demodulates radio signals according to the demodulation scheme.

The channel decoder 230 becomes aware of the type of TDUs constituting a current MPDU through the grouping information (the number of bit levels included in a TDU) provided from the mode selector 290, and performs error correction decoding at a coding rate applied to a corresponding TDU. The coding rate is also provided by the mode selector 290.

Such error correction decoding is a process inverse to the error correction coding in the channel encoder 150, and includes a process of restoring the original data of k bits from a codeword of n bits. Herein, Viterbi decoding is representatively used for the error correction decoding.

The buffer 240 temporarily stores the TDUs restored through the error correction decoding, and provides the TDUs to the demultiplexer 250.

The demultiplexer 250 demultiplexes the restored TDUs and divides the TDUs into bits of multiple bit levels. The bits are sequentially divided from bits $Bit_{m-1}$ of the highest level to bits $Bit_0$ of the lowest level. When the pixel of video data includes multiple sub-pixel components, the divided bits may also exist according to sub-pixel components. Such a demultiplexing process is a process inverse to the multiplexing process performed by the multiplexer 130 of FIG. 11.

The bit assembler 260 assembles the bits of the multiple divided bit levels (from the highest level to the lowest level), thereby restoring uncompressed AV data (i.e. each sub-pixel component). The sub-pixel components (e.g. R, G and B components) restored by the bit assembler 260 are provided to the reproducer 270.

If the reproducer 270 collects each sub-pixel component, i.e. pixel data, and completes one video frame, the reproducer 270 displays the video frame on a display device (not shown) such as a Cathode Ray Tube (CRT), a Liquid Crystal Display (LCD), and a Plasma Display Panel (PDP).

In the above description, uncompressed AV data is used as an example of video data. However, it will be clearly understood by those skilled in the art that the same method can be applied to uncompressed audio data such as wave files.

The elements of FIGS. 11 and 12 may be realized as software, such as a task, a class, a sub-routine, a process, an object, an execution thread and a program, or hardware such as a Field-Programmable Gate Array (FPGA) and an Application-Specific Integrated Circuit (ASIC). Further, the elements may also be realized as a combination of the software and hardware. The elements may be included in a computer-readable storage medium, or may also be partially distributed in multiple computers.

According to the present invention, a data structure suitable for the transmission of large amounts of uncompressed AV data is provided, so that it is possible to effectively perform differential error correction coding in consideration of the importance of bits constituting the uncompressed AV data.

Although a exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A non-transitory computer readable storage medium having recorded thereon a transmission packet for transmitting uncompressed audio or video (AV) data, the transmission packet comprising:
    a payload comprising multiple Transmission Data Units (TDUs) error-correction coded at a predetermined coding rate, the payload being classified according to importance of bits constituting the uncompressed AV data;
    a medium access control (MAC) header comprising information for medium access control; and
    a physical layer (PHY) header comprising information about the predetermined coding rate,
    wherein a mode index is recorded in the PHY header, and denotes two groups comprising:
    a first group including four upper bit levels; and
    a second group including four lower bit levels,
    wherein the two groups are included in each of the multiple TDUs, and a coding rate and a modulation method are applied to each group,
    and when the mode index has a value of 0, the first group and the second group are coded at a coding rate of 1/3 with a quadrature phase shift keying (QPSK) modulation method,
    and when the mode index has a value of 1, the first group and the second group are coded at a coding rate of 2/3 with a QPSK modulation method,
    and when the mode index has a value of 2, the first group and the second group are coded at a coding rate of 2/3 with a 16-quadrature amplitude modulation (16-QAM) modulation method,
    and when the mode index has a value of 3, the first group and the second group are coded at a coding rate of 4/7 and 4/5, respectively, with a QPSK modulation method,
    and when the mode index has a value of 4, the first group and the second group are coded at a coding rate of 4/7 and 4/5, respectively, with a 16 QAM modulation method,
    and when the mode index has a value of 5, the first group is coded at a coding rate of 1/3 with a QPSK modulation method.

2. The non-transitory computer readable storage medium of claim 1, wherein the PHY header comprises a size of the payload and information on whether beam steering information is included in the PHY header.

3. The non-transitory computer readable storage medium of claim 1, wherein one of the multiple TDUs comprises at least one bit level.

4. The non-transitory computer readable storage medium of claim 3, wherein an identical bit level is included in identical types of TDUs among the multiple TDUs.

5. The non-transitory computer readable storage medium of claim 1, further comprising a tail bit for causing error correction coding to be in a zero state and a pad bit for causing a size of data to be a multiple of a number of bits used in one symbol.

6. A transmitter for transmitting uncompressed audio or video (AV) data, the transmitter comprising:
    a unit which generates a transmission packet for transmitting the uncompressed AV data; and
    an RF unit which transmits the generated transmission packet,
    wherein the transmission packet comprises:
    a payload comprising multiple Transmission Data Units (TDUs) error-correction coded at a predetermined coding rate, the payload being classified according to importance of bits constituting the uncompressed AV data;
    a medium access control (MAC) header comprising information for medium access control; and
    a physical layer (PHY) header comprising information about the predetermined coding rate,
    wherein a mode index is recorded in the PHY header, and denotes two groups comprising:
    a first group including four upper bit levels; and
    a second group including four lower bit levels,
    wherein the two groups are included in each of the multiple TDUs, and a coding rate and a modulation method are applied to each group,
    and when the mode index has a value of 0, the first group and the second group are coded at a coding rate of 1/3 with a quadrature phase shift keying (QPSK) modulation method,
    and when the mode index has a value of 1, the first group and the second group are coded at a coding rate of 2/3 with a QPSK modulation method, and when the mode index has a value of 2, the first group and the second group are coded at a coding rate of 2/3 with a 16-quadrature amplitude modulation (16-QAM) modulation method, and when the mode index has a value of 3, the first group and the second group are coded at a coding rate of 4/7 and 4/5, respectively, with a QPSK modulation method, and when the mode index has a value of 4, the first group and the second group are coded at a coding rate of 4/7 and 4/5, respectively, with a 16 QAM modulation method, and when the mode index has a value of 5, the first group is coded at a coding rate of 1/3 with a QPSK modulation method.

7. The transmitter of claim 6, wherein one of the multiple TDUs comprises at least one bit level.

8. A receiver for receiving uncompressed audio or video (AV) data, the receiver comprising:
 a unit receiving a transmission packet comprising the uncompressed AV data and;
 a unit restoring AV data from the received transmission packet,
 wherein the transmission packet comprises:
 a payload comprising multiple Transmission Data Units (TDUs) error-correction coded at a predetermined coding rate, the payload being classified according to importance of bits constituting the uncompressed AV data;
 a Medium Access Control (MAC) header comprising information for medium access control; and
 a physical layer (PHY) header comprising information about the predetermined coding rate,
 wherein a mode index is recorded in the PHY header, and denotes two groups comprising:
 a first group including four upper bit levels; and
 a second group including four lower bit levels,
 wherein the two groups are included in each of the multiple TDUs, and a coding rate and a modulation method are applied to each group,
 and when the mode index has a value of 0, the first group and the second group are coded at a coding rate of 1/3 with a quadrature phase shift keying (QPSK) modulation method,
 and when the mode index has a value of 1, the first group and the second group are coded at a coding rate of 2/3 with a QPSK modulation method,
 and when the mode index has a value of 2, the first group and the second group are coded at a coding rate of 2/3 with a 16-quadrature amplitude modulation (16-QAM) modulation method,
 and when the mode index has a value of 3, the first group and the second group are coded at a coding rate of 4/7 and 4/5, respectively, with a QPSK modulation method,
 and when the mode index has a value of 4, the first group and the second group are coded at a coding rate of 4/7 and 4/5, respectively, with a 16 QAM modulation method,
 and when the mode index has a value of 5, the first group is coded at a coding rate of 1/3 with a QPSK modulation method.

9. The receiver of claim 8, wherein one of the multiple TDUs comprises at least one bit level.

10. The non-transitory computer readable storage medium of claim 1, wherein the error correction coding is classified as block coding.

11. The non-transitory computer readable storage medium of claim 1, wherein the error correction coding is classified as convolution coding.

12. The non-transitory computer readable storage medium of claim 1, wherein the error correction coding is expressed by converting an inputted bit "k" to a codeword of "n" bits.

13. The non-transitory computer readable storage medium of claim 12, wherein the coding rate is k/n.

14. The non-transitory computer readable storage medium of claim 1, wherein the transmission packet further comprises a beam tracking field which records supplementary information for beam steering.

15. The non-transitory computer readable storage medium of claim 14, wherein the PHY header further comprises a one-bit beam tracker which indicates whether the supplementary information for beam steering is included in the transmission packet.

16. The non-transitory computer readable storage medium of claim 3, wherein an identical coding rate is applied to an identical type of TDUs among the multiple TDUs.

17. The transmitter of claim 7, wherein an identical coding rate is applied to identical types of TDUs among the multiple TDUs.

18. The receiver of claim 9, wherein an identical coding rate is applied to identical types of TDUs among the multiple TDUs.

19. The non-transitory computer readable storage medium of claim 1, wherein an Unequal Error Protection (UEP) is applied to the payload and a number of a symbol from which the UEP starts is recorded in the PHY header.

20. The transmitter of claim 6, wherein Unequal Error Protection (UEP) is applied to the payload and a number of a symbol from which the UEP starts is recorded in the PHY header.

21. The receiver of claim 8, wherein an Unequal Error Protection (UEP) is applied to the payload and a number of a symbol from which the UEP starts is recorded in the PHY header.

* * * * *

UNITED STATES PATENT AND TRADEMARK OFFICE
CERTIFICATE OF CORRECTION

PATENT NO. : 7,768,950 B2  Page 1 of 1
APPLICATION NO. : 11/783166
DATED : August 3, 2010
INVENTOR(S) : Ki-bo Kim et al.

It is certified that error appears in the above-identified patent and that said Letters Patent is hereby corrected as shown below:

In the Specification

At Column 5, lines 25-36, Table 1

Delete "

TABLE 1

| HRP mode index | Coding mode | Modulation method | Coding rate | |
|---|---|---|---|---|
| | | | First group [7] [6] [5] [4] | Second group [3] [2] [1] [0] |
| 0 | Equal Error Protection (EEP) | QPSK | 1/3 | |
| 1 | | QPSK | 2/3 | |
| 2 | | 16-QAM | 3/3 | |
| 3 | UEP | QPSK | 4/7 | 4/5 |
| 4 | | 16-QAM | 4/7 | 4/5 |
| 5 | Retransmission | QPSK | 1/3 | infinite |
| 6 | | 16-QAM | 1/3 | Infinite |

"

Insert --

Table 1

| HRP mode index | Coding mode | Modulation method | Coding rate | |
|---|---|---|---|---|
| | | | First group [7] [6] [5] [4] | Second group [3] [2] [1] [0] |
| 0 | Equal Error Protection (EEP) | QPSK | 1/3 | |
| 1 | | QPSK | 2/3 | |
| 2 | | 16-QAM | 2/3 | |
| 3 | UEP | QPSK | 4/7 | 4/5 |
| 4 | | 16-QAM | 4/7 | 4/5 |
| 5 | Retransmission | QPSK | 1/3 | infinite |
| 6 | | 16-QAM | 1/3 | Infinite |

--

Signed and Sealed this
Ninth Day of September, 2014

Michelle K. Lee
*Deputy Director of the United States Patent and Trademark Office*